Patented Aug. 9, 1932

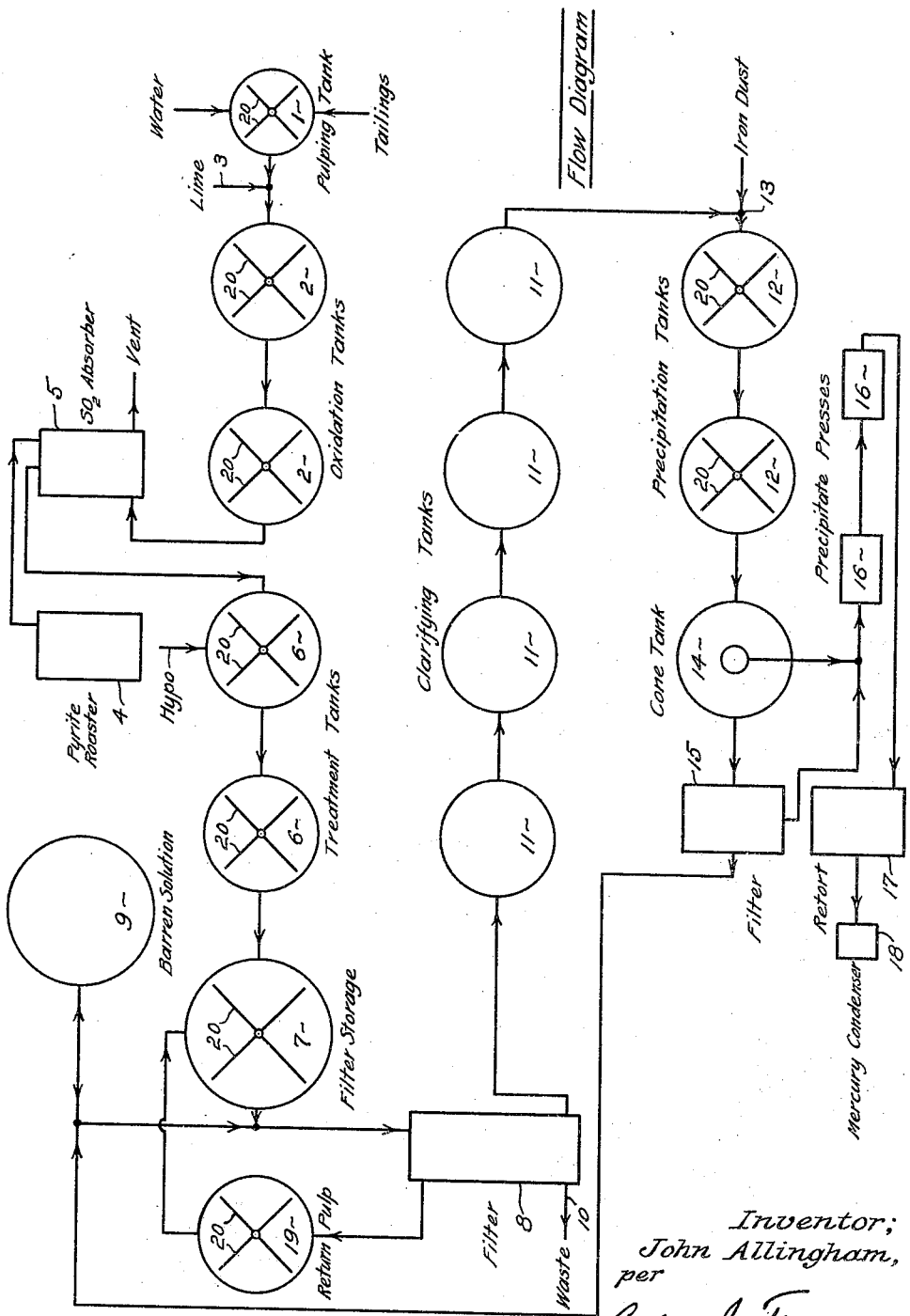

1,870,703

UNITED STATES PATENT OFFICE

JOHN ALLINGHAM, OF LOS ANGELES, CALIFORNIA

METALLURGICAL PROCESS

Application filed April 17, 1931. Serial No. 530,830.

In this specification, and the accompanying drawing, I shall describe and show a preferred manner of utilizing my invention, and specifically mention certain of its more important objects. I do not limit myself to the particular methods disclosed, however, since various changes and adaptations may be made therein without departing from the essence of my invention as hereinafter claimed; and objects and advantages, other than those specifically mentioned, are included within the scope of the invention.

My invention relates to means for extracting certain metals from ores and mill tailings; and particularly to processes for the extraction of mercury, gold, silver, and copper from tailings which have resulted from the Patio and Pan-amalgamation processes. Tailings of the latter class frequently contain organic matter in chemical combination with the above stated metals, forming organic salts thereof. Hitherto it has been found to be impracticable to recover these metals from such organic salts, by any method known to the art. Cyanide and hypo processes in such cases are of no commercial value, chiefly on account of the insolubility of the organic salts of the particular metals we are here considering.

The principal object of my invention is to provide practical commercial means for recovering mercury, gold, silver, and copper, from tailings and ores of the character described; and among the subsidiary objects are to provide a simple arrangement of standard and well known apparatus that is adapted for accomplishing this by a continuous process, in an efficient and economical manner. Other objects and advantages of the invention will appear from a consideration of the following description.

My objects are attained in a manner illustrated in the accompanying drawing, which is a flow diagram showing a specific arrangement of apparatus for carrying out my process. This arrangement of apparatus, when operated in the manner to be described, is adapted for recovering gold, silver, mercury, and copper from tailings and ores, even when such metals are in the form of organic salts.

The chemistry involved in treating such ores and tailings as those mentioned above, is often very complex, on account of changes which have been effected by decomposing organic matter extending over long periods of time. Such decomposing organic matter is commonly known as humus. The acids from this humus are commonly called humic and ulmic acids, and their salts react upon metals to produce humates and ulmates. In reality this humus consists of many complex organic compounds and acids. My experimental work in this field has demonstrated that the metals in such ores and tailings, although they may first exist in the form of chlorides, carbonates, sulphates, and even metallic gold, are changed after long periods of time to the form of complex organic salts when humus is present, especially when they are exposed to the effects of the atmosphere and weather.

I have found that certain of the inorganic salts of the particular metals mentioned, are soluble in hypo (thiosulphate of calcium or sodium), or in an alkaline solution of cyanide, but that most of the organic salts of these metals are insoluble in hypo and cyanide. I have discovered, however, that there are several ways of converting such insoluble organic metallic salts into soluble salts.

One method of accomplishing this result consists in the process of oxidizing the organic metallic salts, and these free organic acids, in the dump. Making the material slightly alkaline renders it more easily oxidizable, and a slight excess of alkali may play the role of a catalytic agent. Such material originally is slightly acid, due to the free organic acids present. When lime is added it combines with these free acids to form organic calcium salts. This treatment ordinarily will not make the oxidation complete however, and complete oxidation can only be obtained in this manner by repeatedly wetting and drying the treated material.

A second method is to treat the material described, in a wet condition, with sulphur dioxide, or directly with sulphurous acid.

The effect of this treatment is to break up the organic salts of the metals, thus producing sulphites of the metals, and liberating non-metallic organic salts.

A third procedure comprises a combination of the above two methods, and it will in most cases be found to be the most economical and satisfactory process for obtaining the highest recoveries of metals from material of the character described. In this combination treatment, the addition of an alkaline thiosulphate changes the insoluble sulphites to the form of soluble double thiosulphates of the metals.

Passing now to a description of the process, and the arrangement of apparatus that constitutes the present invention, the first step is to prepare a suitable pulp of the metal-bearing material that is to be treated. If such material is not already sufficiently fine, it should be ground to a fineness adapted to give the best recovery in the process. If it is fine enough to pass a 100-mesh screen, it ordinarily will be well adapted for the process to be described. The fine material is mixed with water in suitable proportions, in pulping tank 1. The ratio of the material that is to be treated to water, may be one to two, or other suitable proportion, determined by the character of the material. The pulp passes from pulping tank 1 into one or more oxidation tanks 2 connected in series, but before entering the first of these two tanks, lime is added at 3, in sufficient quantity to make the pulp slightly alkaline.

The second step in the process consists in thoroughly oxidizing the alkaline pulp in tanks 2. This may be accomplished in several well known ways, such as by passing air through the pulp in these tanks, or by spraying the pulp into the atmosphere within the tanks.

The third step of the process consists in subjecting the oxidized pulp coming from tanks 2, to the action of sulphur dioxide gas. Such gas may be prepared in any suitable manner, as by means of a pyrite roaster 4. The oxidized pulp from tanks 2 flows into an $SO_2$ absorber 5, this being supplied with sulphur dioxide gas from the pyrite roaster. A convenient form of the absorber 5 is what is commonly known as a "disk absorber". This comprises a horizontal cylindrical tank having a series of discs therein upon a mechanically driven shaft, the discs being foraminous in character, thus presenting a large amount of surface that is constantly kept wet by the revolution of the discs. The amount of sulphur dioxide gas that is necessary in ordinary practice has been found to be from 5 to 15 pounds per ton of the material treated, but the exact amount required will depend upon the character of the material, and should be determined by experimental runs.

The fourth step in the process is to pass the pulp which has been oxidized and subjected to the action of the sulphur dioxide gas, into one or more treatment tanks 6 in series. In these tanks the pulp is treated to the action of an alkaline thiosulphate, such as calcium thiosulphate. The amount of this reagent varies in practice with the character of the tailings, but ordinarily about eight pounds of the reagent per ton of tailings, is sufficient to obtain commercial extractions. The thus treated pulp then passes to filter storage tank 7.

The fifth step of my process consists in separating what is now the solid non-metallic matter in the pulp from the metal bearing liquids, by ordinary methods of filtration, to produce a filtered solution that contains dissolved salts of mercury, gold, silver, and copper. This is accomplished by passing the treated pulp from tank 7 into a filter 8, and separating the liquids from the solids therein. A "Butters Filter" may be found to be suitable for this purpose, and the filter cake resulting from the operation of the filter is washed with a metal-barren solution coming from a storage tank 9. The barren solution in this tank comes from other apparatus to be described presently. The non-metallic solid material produced by filter 8 is discharged to the dump at 10. The filtered solution of metallic salts from this filter is passed through several clarifiers 11 in series, to permit of settlement of such non-metallic solid particles as may still be held in suspension.

From the last tank 11 of the above series, the metal bearing solution passes to one or more precipitation tanks 12 in series, as the sixth step of the process. On its way to these tanks, a suitable precipitating agent, such as ground iron sponge, is added at the point 13, for causing precipitation of the metallic salts contained in the solution.

The seventh step consists in separating the precipitated metallic salts from the barren liquid, by methods of filtration. From the precipitation tanks 12 the material flows to a cone tank 14, where the heavier portions of the precipitate settles. The solution, containing some of the lighter portions of the precipitate in suspension, then flows to a filter 15, and the filtered barren solution from the latter is pumped to barren-solution tank 9 mentioned above. The precipitates from cone tank 14, and also from filter 15 are pumped into one or more precipitate presses 16, where most of the remaining liquid is squeezed out of the precipitates.

The eighth and final step of the process consists in passing the wet pressed precipitate, produced by presses 16, into a mercury retort furnace 17, where mercury is distilled from the other metallic material. The mercury vapor is led to condenser 18, where metallic mercury is collected.

The metallic material that remains in retort 17, after completing the distillation process, is a concentrate of copper, silver, and gold. This may be smelted by usual methods.

Tank 19 is a return pulp tank for receiving excess pulp from the large filter 8 at each cycle of its operation. It discharges into the filter storage tank.

It is desirable to supply mechanical agitation means in tanks 1, 2, 6, 7, 12 and 19, as by power driven paddles 20. It will be understood that various valves, pumps, miscellaneous appliances, and sources of mechanical power, will be provided where required, to accomplish the desired processes in a convenient and economical manner.

It will be noted that, except for the necessarily cyclic operation of the filters and presses, my process is substantially continuous in character. It will be seen further that it is well adapted for treating ores and tailings of the kind described, that contain organic metallic salts of gold, silver, copper, or mercury, in an efficient and economical manner; and it will therefore be recognized as constituting a commercially practical process.

Having thus fully described my invention, I claim:

1. The metallurgical process for treating material containing organic salts of gold, silver, copper, or mercury, which comprises; making said material slightly alkaline, to render the salts more easily oxidizable; oxidizing the salts in the alkalized material; and then subjecting the oxidized salts to the action of sulphur dioxide.

2. The metallurgical process for treating material containing organic salts of gold, silver, copper, or mercury, which comprises; making said material slightly alkaline, to render the salts more easily oxidizable; oxidizing the salts in the alkalized material; subjecting the oxidized salts to the action of sulphur dioxide; and then dissolving the thus prepared salts in a thiosulphate solution.

3. The metallurgical process for treating material containing organic salts of gold, silver, copper, or mercury, which comprises; making said material slightly alkaline, to render said salts more easily oxidizable; oxidizing said salts in the alkalized material; subjecting said oxidized salts in a wet condition, to the action of sulphur dioxide; and then subjecting the thus prepared metallic sulphites to the action of an alkaline thiosulphate, to change them to the form of soluble double thiosulphates of the metals.

4. The metallurgical process for treating material containing organic salts of gold, silver, copper, or mercury, which comprises; making said material slightly alkaline; oxidizing said salts in the alkalized material; treating said oxidized salts to convert them into metallic sulphites; converting said sulphites into soluble salts in solution; and then precipitating the metals from said solution.

5. The metallurgical process for treating material containing organic salts of gold, silver, copper, or mercury, which comprises; making said material slightly alkaline; oxidizing said salts in the alkalized material; treating said oxidized salts to convert them into metallic sulphites; converting said sulphites into soluble salts in solution; and then adding iron sponge to said solution to precipitate the metals therein.

6. The metallurgical process for treating material containing organic salts of gold, silver, copper, or mercury, which comprises; in sequence; preparing a pulp of said material; oxidizing said pulp in the presence of an alkali; treating the oxidized pulp in a manner to change the metallic salts to metallic sulphites; treating the thus prepared material in a manner to change said sulphites to soluble double thiosulphates of the metals, in solution; separating the solids from said solution; and precipitating the metals from said solution.

JOHN ALLINGHAM.